(12) United States Patent
Ciriza et al.

(10) Patent No.: US 8,384,941 B2
(45) Date of Patent: Feb. 26, 2013

(54) SYSTEM AND METHOD FOR ENABLING AN ENVIRONMENTALLY INFORMED PRINTER CHOICE AT JOB SUBMISSION TIME

(75) Inventors: Victor Ciriza, La Tour du Pin (FR);
Maria Antonietta Grasso, Grenoble (FR); Yves Hoppenot, Notre-Dame-de-Mésage (FR); Jutta K. Willamowski, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 12/819,437

(22) Filed: Jun. 21, 2010

(65) Prior Publication Data

US 2011/0310428 A1  Dec. 22, 2011

(51) Int. Cl.
  *G06F 15/00*  (2006.01)
  *G06F 9/46*  (2006.01)
(52) U.S. Cl. ............................. 358/1.15; 718/102
(58) Field of Classification Search .......... 358/1.15
See application file for complete search history.

(56) References Cited

U.S. PATENT DOCUMENTS

| | | | |
|---|---|---|---|
| 7,072,066 B2 | 7/2006 | Guddanti | |
| 2006/0039026 A1 | 2/2006 | Lofthus et al. | |
| 2006/0132826 A1 | 6/2006 | Ciriza et al. | |
| 2006/0206445 A1 | 9/2006 | Andreoli et al. | |
| 2007/0146772 A1 | 6/2007 | Castellani | |
| 2007/0268509 A1 | 11/2007 | Andreoli et al. | |
| 2008/0246987 A1 | 10/2008 | Scrafford et al. | |
| 2008/0297830 A1 | 12/2008 | Sewell et al. | |
| 2008/0300879 A1 | 12/2008 | Bouchard et al. | |
| 2009/0138878 A1* | 5/2009 | Fernstrom et al. | 718/102 |
| 2010/0145647 A1 | 6/2010 | Bouchard et al. | |

OTHER PUBLICATIONS

Xerox Mobile Express Driver (XMED), http://www.office.xerox.com/latest/SFTBR-14U.PDF (2008).
Srivastava, et al. "Predictive System Shutdown and Other Architectural Techniques for Energy Efficient Programmable Computation," IEEE Transactions on Very Large Scale Integration (VLSL) Systems, vol. 4, No. 1, Mar. 1996.
Darby, S. Why, What, When, How, Where and Who? Developing UK Policy on Metering, Billing and Energy Display Devices, 2008 ACEEE Summer Study on Energy Efficiency in Buildings.
U.S. Appl. No. 12/773,165, Grasso, et al.
U.S. Appl. No. 12/499,986, Dance, et al.

* cited by examiner

*Primary Examiner* — Saeid Ebrahimi Dehkordy
(74) *Attorney, Agent, or Firm* — Fay Sharpe LLP

(57) ABSTRACT

A system and method for facilitating environmentally informed print job selection are provided. The method includes assigning a status to each of a set of networked printers, the status of an operational printer denoting a printer as being one of at least awake, asleep, and waking up soon. The assigned status is provided to a graphical user interface, enabling a user to compare the status and/or environmental costs of printing with user selectable ones of the set of printers.

25 Claims, 7 Drawing Sheets

SYSTEM AND METHOD FOR ENABLING AN ENVIRONMENTALLY INFORMED PRINTER CHOICE AT JOB SUBMISSION TIME

BACKGROUND

The exemplary embodiment relates to a system and method for promoting environmentally-informed selection of printers for execution of print jobs. It finds particular application in conjunction with a network printing system in which multiple shared printers are available to users for printing their print jobs and will be described with particular reference thereto.

Network printing systems, in which print jobs can be selectively directed from a workstation to one of a group of shared devices, are now common. The network devices are typically printers or multifunction devices (MFDs), such as those with printing, copying and optionally faxing and email capability, all of which will be referred to as printers. A printer typically receives an incoming print job and places it in a queue with other print jobs and then prints them in order. Since demands for printing vary over time, the printers typically have two or more modes in which the printer is either capable of printing or capable of being automatically raised to a mode in which it is capable of printing. A printer may thus have at least two modes which consume power including a ready mode, in which the device is ready for printing, and a stand-by or automatic power saving mode. Generally, when the printer has been idle for a certain period of time, it automatically goes into the stand-by mode, with reduced power consumption. The wake-up process can be quite lengthy. Some printer models therefore provide different levels of "readiness" to maintain an acceptable balance between power consumption and wake-up time, and in some cases they provide self-adaptive power-mode management by measuring the daily periods when printers are typically being used, in order to anticipate the wake-up and the transition to ready mode.

For certain printers, the difference in power consumption between stand-by and ready modes is significant. For example, in the case of printers using solid ink technology, the ink is melted to convert it from a solid to a liquid prior to printing. In the ready mode, the ink is maintained at an increased temperature level, resulting in higher power consumption. The warm-up from stand-by to ready mode involves significant energy consumption to melt the solid ink and also consumes ink to clean the print heads. Once the warm-up has been completed, the printer is ready for operation and starts printing (generally, after a quick transition through an idle state). When printing ends, the printer enters the idle state where, in the case of solid ink printers, the ink is maintained in liquid form. If no new print job is submitted to the printer, it will eventually return to its stand-by mode.

Typically, print jobs are handled in such a way as to execute jobs as soon as possible. Print jobs are added to the printer's print queue and sent to the printer if the printer is in a ready mode or warming-up state. If the printer is in the stand-by mode, a command is sent to wake it up. In a situation where the printer is used infrequently, this may result in many daily wake-ups and periods when the printer is in the ready mode, waiting for another print job. This form of "eager" printing has the advantage that latency for users is minimal. In many cases, this may be the optimal behavior, but there are also many situations where users may be willing to accept a later printing, if this could lead to reduced consumption of power and/or consumables (e.g., ink, paper), and hence cost. For example, printing frequently occurs to prepare off-line reading material, to facilitate off-site working, to prepare meeting materials, and the like.

In addition users often have some choice in the printers that they use and can select options, such as whether to print in black and white or color, the type of paper to use, and so forth. In general, users do not have an understanding of how all these choices impact the environment or how they could carry out their printing in a manner which has less environmental impact while performing their work efficiently.

INCORPORATION BY REFERENCE

The following references, the disclosures of which are incorporated herein in their entireties by reference, are mentioned:

U.S. patent application Ser. No. 12/773,165, filed May 4, 2010, entitled SYSTEM AND METHOD FOR PROVIDING ENVIRONMENTAL FEEDBACK TO USERS OF SHARED PRINTERS, by Maria Antonietta Grasso, et al., discloses a system and method for quantifying resource usage for review by a user. Marking engine data containing information related to a print job sent to a marking engine and community data relating to resource usage by members of a plurality of communities within a system are collected. A resource profiling component receives the marking engine data and the community data to evaluate resource usage by a user compared to one or more other users within their community. A visualization component receives the evaluation from the resource profiling component, generates a graphic associated with the evaluation, and distributes the graphic to one or more recipients.

U.S. Pub. No. 20090138878, published May 28, 2009, entitled ENERGY-AWARE PRINT JOB MANAGEMENT, by Christer E. Fernstrom, et al., discloses a printing system and method for processing print jobs in a network of printers. The printers each have high and low operational states. A job ticket is associated with each print job. The job ticket designates one of the network printers as a target printer for printing the job and includes print job parameters related to redirection and delay for the print job. Where the target printer for the print job is in the low operational state, the print job related redirection and delay parameters for the job are identified. Based on the identified parameters, the print job may be scheduled for at least one of redirection and delay, where the parameters for redirection/delay permit, whereby the likelihood that the print job is printed sequentially with another print job on one of the network printers, without that one printer entering an intervening low operational state, is increased.

U.S. Pub. No. 20060132826, published Jun. 22, 2006, entitled AUTOMATED JOB REDIRECTION AND ORGANIZATION MANAGEMENT, by Victor, Ciriza et al., discloses mining job logs in order to compute a redirection matrix for managing operation of a plurality of systems. The redirection matrix may be used to identify alternative systems in the event a user selected system becomes unavailable to which a job may be redirected. In addition, the redirection matrix may be used to compute a network printer topology and print clusters for use with network management and system analysis.

U.S. Pub. No. U.S. Pub. No. 20060206445, published Sep. 14, 2006, entitled PROBABILISTIC MODELING OF SHARED DEVICE USAGE, by Jean-Marc Andreoli, et al., discloses methods for estimating parameters of a probability model that models user behavior of shared devices offering different classes of service for carrying out jobs. In operation, usage job data of observed users and devices carrying out the jobs are recorded. A probability model is defined with an observed user variable, an observed device variable, a latent job cluster variable, and a latent job service class variable. A range of job service classes associated with the shared devices is determined, and an initial number of job clusters is selected. Parameters of the probability model are learned using the recorded job usage data, the determined range of service classes, and the selected initial number of job clusters. The learned parameters of the probability model are applied to evaluate one or more of: configuration of the shared devices, use of the shared devices, and job redirection between the shared devices.

U.S. Pub. No. 20070268509, published Nov. 22, 2007, entitled SOFT FAILURE DETECTION IN A NETWORK OF DEVICES, by Jean-Marc Andreoli et al., discloses a method for monitoring hardware devices of the hardware devices network to detect failures. Past logged jobs are analyzed to determine a pattern of past usage of hardware devices by users of the hardware devices network. A failure of a hardware device is inferred based on a deviation in usage of the hardware devices from the pattern of past usage. In some embodiments, a state model is constructed that assigns one of two or more available operational states to each hardware device of the hardware devices network based on a recent load of jobs logged to the hardware device and a stored history of logged jobs indicative of typical loading of the hardware devices. One or more failing hardware devices are identified based on the assigned operational states.

U.S. Pub. No. 20080300879, published Dec. 4, 2008, entitled FACTORIAL HIDDEN MARKOV MODEL WITH DISCRETE OBSERVATIONS, by Guillaume Bouchard, et al., discloses a method for analyzing hidden dynamics, includes acquiring discrete observations, each discrete observation having an observed value selected from two or more allowed discrete values. A factorial hidden Markov model (FHMM) relating the discrete observations with a plurality of hidden dynamics is constructed. A contribution of the state of each hidden dynamic to the discrete observation may be represented in the FHMM as a parameter of a nominal distribution which is scaled by a function of the state of the hidden dynamic. States of the hidden dynamics are inferred from the discrete observations based on the FHMM. Information corresponding to at least one inferred state of at least one of the hidden dynamics is output. The parameters of the contribution of each dynamic to the hidden states may be learnt from a large number of observations. An example of a networked printing system is used to demonstrate the applicability of the method.

U.S. application Ser. No. 12/328,276, filed Dec. 4, 2008, entitled SYSTEM AND METHOD FOR IMPROVING FAILURE DETECTION USING COLLECTIVE INTELLIGENCE WITH END-USER FEEDBACK, by Guillaume Bouchard, et al., discloses systems and methods that facilitate using end-user feedback to distinguish automatically between a normal behavior on a device and a device failure which can be a hard (machine detectable) failure or a soft failure.

U.S. patent application Ser. No. 12/499,986, filed Jul. 9, 2009, entitled PRINTER TIME-OUT, by Christopher R. Dance, et al., discloses a method of computing a time-out for a device includes acquiring data comprising a set of inter-arrival times for at least one device. This set of inter-arrival times values can be examined as the set of candidate time-outs. For each of a set of candidate time-outs, the method includes deriving a probability that an inter-arrival time from the set of inter-arrival times is greater than the candidate time-out. A cost function is computed, based on the derived probability and a robustness term and a time-out identified for the at least one device as the one minimizing the cost function value.

US Pub No. 20070146772, published Jun. 28, 2007, entitled AUTONOMOUS DECISION-MAKING IN PRINT JOB REDIRECTION, by Stefania Castellani, discloses a printing system includes printers capable of redirecting print jobs to one another.

U.S. Pub. No. 20080297830, published Dec. 4, 2008, entitled PRINTER WITH OUTSOURCING CAPABILITY FOR COLOR COPIES, by Michael B. Sewell, et al., discloses a printing system including communicatively linked printers, each including a print engine and a processor which controls the operation of the respective print engine. A scanner, associated with the first printer, scans a hardcopy document and generates image data therefrom. A print job derived from the image data can be printed on the first print engine or exported to the second printer for printing.

U.S. Pub. No. 20080246987, published Oct. 9, 2008, entitled METHODS AND SYSTEMS FOR SOFT FAILURE DETECTION FOR NETWORKED PRINTERS, by Matthew Scrafford, et al., discloses methods and systems for identifying potential printer failures in a networked printing enterprise, in which job tracking data is gathered for print jobs in the network, affinity data is derived from the job tracking data indicating associations between printer devices and user devices, and potential printer failures are identified based on changes in the affinity data.

U.S. Pat. No. 7,072,066, issued Jul. 4, 2006, entitled SYSTEM AND METHOD FOR SAVING POWER USING PRIORITY PRINTING, by Guddanti, discloses a method and apparatus for saving power in a printing system, by prioritizing printer jobs. Using a graphical user interface, an end-user assigns a print time to a first job. The print time designation is attached to the first job and the first job is transmitted from the end-user station to a printer. Based on whether the printer is in ready mode or in power save mode, the first job is printed immediately or stored in memory. When the first job is stored in memory, computations are made to determine a printing time to initiate printing of the first job. The first job is then printed at the printing time or at an earlier printing time if a second job with an earlier printing time is stored in the memory.

U.S. Pub. No. 2006/0039026, published Feb. 23, 2006, entitled PRINT SEQUENCE SCHEDULING FOR RELIABILITY, by Lofthus, et al., discloses a method for scheduling print jobs for a plurality of printers. A scheduler schedules a sequence for printing the print jobs by the printers, based on minimizing, for at least one of the plurality of printers, a number of periods of time during the sequence of printing where the at least one printer is in a non-operational mode, and/or maximizing continuous run time for at least one of the printers.

BRIEF DESCRIPTION

In accordance with one aspect of the exemplary embodiment, a method for facilitating environmentally informed print job selection includes, with a processor, assigning a status to each of a set of networked printers, the status of an operational printer denoting a printer as being one of at least awake, asleep, and waking up soon. The assigned status is provided to a graphical user interface, enabling a user to compare environmental costs of user selectable ones of the set of printers.

In accordance with another aspect of the exemplary embodiment, a system for facilitating environmentally informed print job selection includes memory storing instructions for assigning a status to each of a set of networked printers, the status of an operational printer denoting a printer as being one of at least awake, asleep, and expected to awake shortly, computing an environmental cost for a print job based on a selected printer and its assigned status; and providing at least one of the assigned status and the environmental cost to a graphical user interface, enabling a user to compare the at least one of the assigned status and environmental costs of user selectable ones of the set of printers. A processor is in communication with the memory for executing the instructions.

In accordance with another aspect of the exemplary embodiment, a graphical user interface, hosted by a computer with a processor and memory, is configured to display a printer selection menu in which an environmental cost of printing a print job on each of a plurality of user selectable printers is represented, the environmental cost being derived, at least in part, from a status of the selectable printers, whereby the environmental cost of printing the job on a first of the printers is higher when the first printer has to be woken up to perform the print job than when the first printer does not have to be woken up.

In accordance with another aspect, a method for facilitating environmentally informed print job selection includes, with a processor, assigning a status to each of a set of networked printers, the status of an operational printer denoting a printer as being one of at least awake, asleep, and waking up soon. An environmental cost for a print job based on a selected printer and its assigned status is computed. The environmental cost is provided to a graphical user interface, enabling a user to compare environmental costs of user selectable ones of the set of printers.

DETAILED DESCRIPTION

The exemplary embodiment relates to a system and method for enabling a user of a printer network to make an environmentally informed printer choice for a print job. In the exemplary embodiment, printer status information and an indication of the environmental cost of choosing various printers is made available to the user when the user selects an object for printing.

The term "device" or "printer," as used herein, broadly encompasses various printers, copiers, bookmaking machines, or multifunction machines, xerographic or otherwise, unless otherwise defined, which performs a print job rendering function for any purpose.

A "printer network," as used herein incorporates a plurality of shared devices, which are accessible to one or more workstations, such as personal computers.

The term "print medium" generally refers to a physical sheet of paper, plastic, or other suitable physical print media substrate for images, whether precut or web fed.

A "print job" generally includes a "printing object," which consists of one or more document images in a suitable format that is recognized by the printer, e.g., Postscript, together with a "job ticket," which provides information about the print job that will be used to control how the job is processed.

Figure 1:
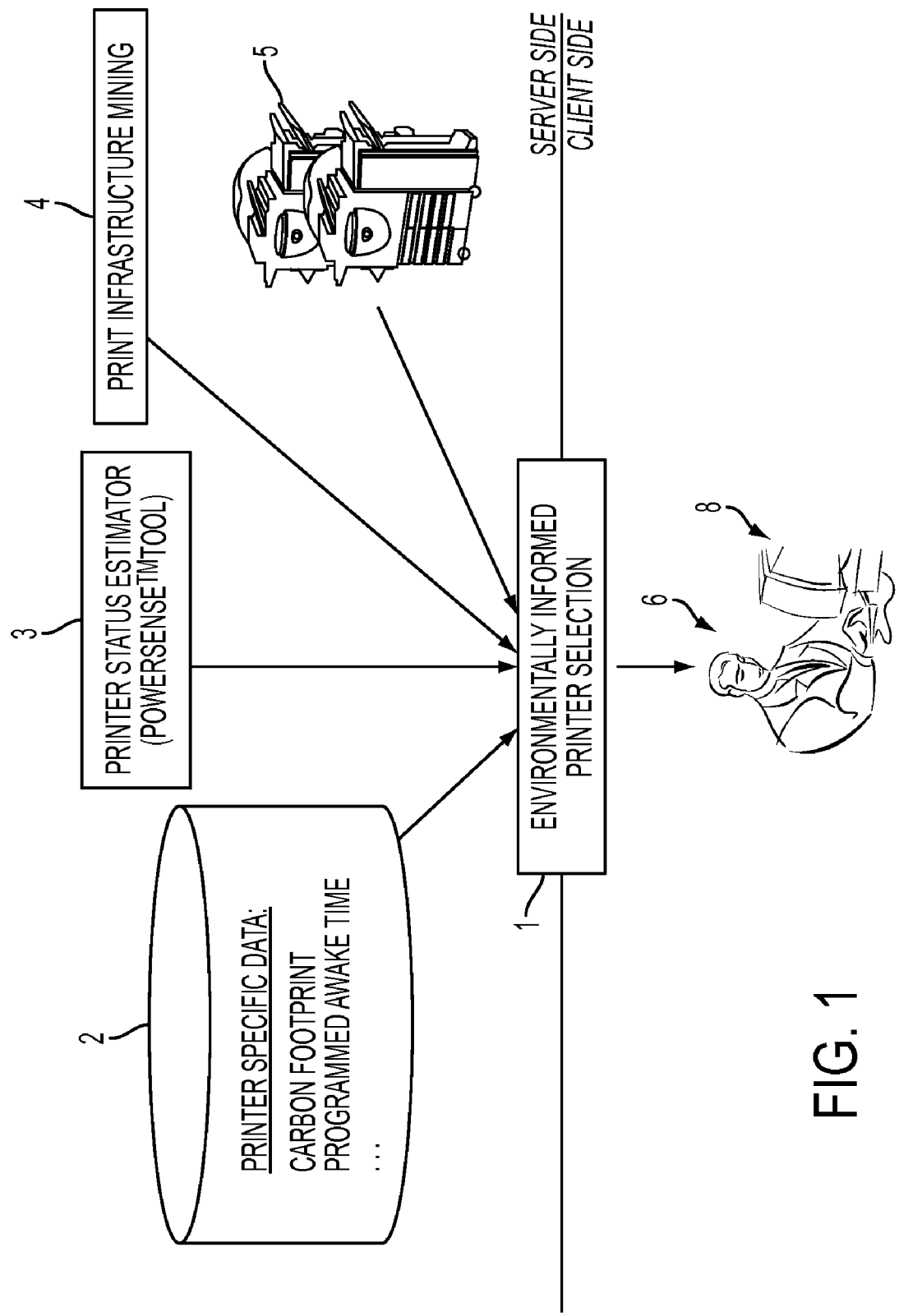
FIG. 1 is schematic view of an environmentally informed printer selection system.

With reference to FIG. 1, simplified view of a printing environment is illustrated which hosts a system 1 for environmentally informed printer selection. The system 1 has access to printer-specific data 2, as well as tools 3, 4, for determining the future status of available printers 5 and for mining printer usage date to identify a set of printers favored by a user 6.

The system 1 provides the user with printer-related information. The information may be made available permanently and/or when he is about to launch a print job. The information is made available to the user through a graphical user interface, e.g., on his workstation 8, for example, using readily understood icons and other graphical representations.

The information provided to the user about the available printers may include their:
1. Current status (e.g., awake/asleep)
2. Foreseen status (e.g., will wake up at an expected future time)
3. Carbon footprint (e.g., currently, and in optimal status)

The carbon footprint (or, more generally, the environmental cost) of a print job is a measure (which in this case can be approximate) of the impact that a print job will have on the environment in terms of the amount of greenhouse gases produced, which may be measured in units of carbon dioxide. The environmental cost may be determined as a function of the type of printer selected for the print job, its current status, and optionally also parameters of the print job (e.g., double sided printing uses less paper and thus may be assigned a lower contribution to the print job's environmental cost).

The environmental cost may be, for example, an estimate of all costs associated with printing a print job or an add-on cost computed by subtracting a baseline cost for printing the job at the lowest environmental cost available to the user, which is thus assigned a zero cost. In one embodiment, each operational printer may be assigned a per-page environmental cost for each of a set of states, where the "awake" state is assigned the lowest environmental cost and the "asleep" state is assigned higher environmental cost which is equivalent to the awake cost plus a waking-up cost.

To allow the user to take into account personal constraints and preferences, such as with respect to time (e.g., how urgent is the job), location (e.g., will the user have to waste too much time walking to the printer to pick up the job), and financial cost (e.g., if the job is a draft, the cost of printing on a high quality printer may not be justified), the system 1 may be enhanced with corresponding complementary information which allows the user to take into account these personal constraints and preferences, such as:
1. The current size of the print queue (allowing the user to estimate the print delay)
2. Possible problems on the printer requiring attention (more or less serious, from: paper jam to scheduled repair)
3. The location (proximity to the user/usual printer)
4. The financial cost of printing (which is determined using different parameters to the environmental cost)

Providing this information together, though a single interface, provides the user with the relevant information about the possible printers on which to make an informed choice of printer selection when submitting his job.

Figure 2:
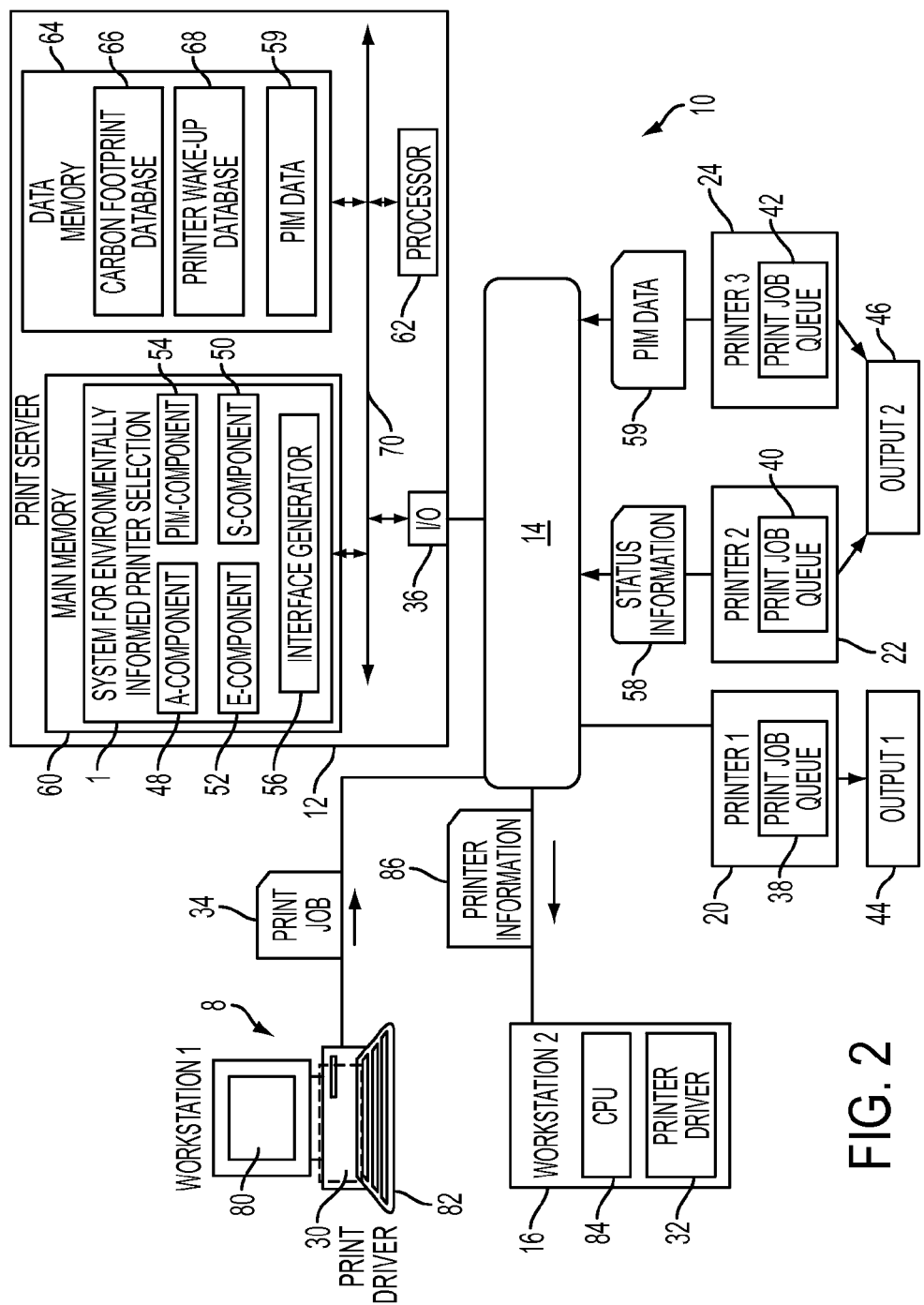
FIG. 2 is a functional block diagram of an environment in which an exemplary print job management system operates in accordance with one aspect of the exemplary embodiment.

With reference to FIG. 2, an exemplary printing network 10 in which the exemplary system 1 is incorporated is shown. One or more computing devices, such as the illustrated server 12, host the system 1. The exemplary server is a print server which also controls the distribution of print jobs to network printers, although these functions may alternatively be performed by a separate print server. The print server is communicatively linked by a network 14 to one or more workstations analogous to workstation 8, here illustrated as first and second workstations 8 and 16, and to a plurality of shared printers, here illustrated as first, second, and third printers 20, 22, 24, although fewer or more networked workstations and/or shared printers may be provided. Each workstation 8, 16 is associated with a respective printer driver 30, 32, which generates print jobs 34. Print jobs 34 are received by an input/output 36 to the print server 12, via the network 14. The input/output 36 may also serve as a network interface which allows the server 12 to communicate with the network 14 and ultimately with the workstations 8, 16 and networked printers 20, 22, 24.

The print jobs arriving from the plurality of workstations 8, 16 are directed by the server 12 to the appropriate printers in accordance with their job tickets and sent to one or more of the printers 20, 22, 24 for printing. The printers 20, 22, 24 place the print jobs 34 in their respective print queues 38, 40, 42. The printers 20, 22, 24 render the print jobs 34 on print media and output the printed media to one or more output devices, such as finishers, trays, or the like, here illustrated as outputs 44, 46.

The system 1 for environmentally informed printer selection includes various components for implementing the exemplary method described in greater detail below with respect to FIG. 3. These components include an acquisition component (A-component) 48, a printer status computation component (S-component) 50, an environmental cost computation component (E-component) 52, and a print infrastructure mining (PIM) component 54, and an interface generation component 56. While all of these components are shown as being resident on the print server 12, it is to be appreciated that some or all of the components or parts thereof may be located elsewhere in the network, such as on the workstations 8, 16, and/or may be accessible to the server 12, e.g., via a web link.

The acquisition component 48 may acquire the number of the jobs currently in the printer's queue 38, 40, 42.

The status computation component 50 computes a printer's status, such as whether it is awake or asleep and when it is likely to wake up, utilizing, for example, a tool 3, such as the PowerSense™ tool (FIG. 1), which determines the power used by a printer, and from that determines whether it is awake or asleep. Such a tool may also identify when the printer is expected to wake up. For example, the printer may be programmed to wake up at certain times, which may vary over the course of the day, and this information is acquired by the tool 3. In other embodiments, the tool may observe a pattern of behavior by the printer over the course of several hours or days and from that, deduce its power mode protocol (e.g., how long the printer will wait for another job after printing one before going to sleep if no further job(s) arrive and how long it will stay asleep before automatically waking up if there is no print job waiting to be printed, both of which may vary over the course of a day). The tool can then predict when the printer is scheduled to wake up next, based on the deduced protocol. Alternatively, the power model protocol could be obtained from the printer manufacturer or the tool 3, itself, may compute the time out protocol. Above-mentioned application Ser. No. 12/499,986 discloses one method for setting an appropriate time-out period (how long the printer waits before going to sleep if there is no print job pending) for one or more of the network printers, which is based on the printing habits of the network users which weighs the energy costs of a selected time-out period as well as the potential annoyance of users caused by the wake-up delay. Such a method may be used in the present system and the information used by the status computation component 50.

The environmental cost computation component 52 computes a measure of the environmental cost of printing a print job on each of at least a subset of the network printers, based on their status information (as output by components 48, 50), printer specific data 2 relating to its carbon footprint (environmental cost of printing when the printer is awake) and energy cost of waking it up, and queue information. Carbon footprint information can be obtained from a local or remote dedicated database which may be modified by the geographical location of the printer in the world. The database may provide carbon footprints for each of a set of printer types, optionally, as affected by a set of different print job types, which factor in the environmental costs of the consumables, such as using different types of print media available on the printer, different types of marking media (color vs. black and white printing, inks vs. toners), and printing protocols which can affect how much of the consumables are used (e.g., duplex vs. single sided printing, draft mode vs. presentation mode). The environmental costs of the consumables may also take into account the environmental costs of delivery of the selected consumables to the location of the printer (some consumables may have to come from a further distance than others, and/or printers of the network may be in different geographic locations). Financial printing costs can be made available in a dedicated database.

The print infrastructure mining component 54 identifies favored printers for the user, utilizing, for example, the PIM tool 4 (FIG. 1). This tool identifies local printers for a particular workstation by mining data 59 for many print jobs to identify the printers most frequently used. Print infrastructure mining analyzes the print actions-related data acquired the printers to understand the dynamics of the work environment, user habits and the inter-device relations. It has been developed to enable print re-routing and optimizing the infrastructure. Through the analysis of user behavior it enables information about the geographic proximity of printers to be inferred. It is able to do so, by observing to which printer the user switches in the case of printer failure, and by observing a recurrent pattern it is able to infer geographical proximity over other printers that are not chosen. The PIM tool is also able to infer soft failures of printers, i.e., printers which do not self-report as being broken, but can be assigned to the "broken" status based on unexpected changes in printer usage patterns. For example, if users notice that a printer is printing poor quality prints, they will send their job to a different printer. Such systems are described, for example, in above-mentioned U.S. Pub. Nos. 20060132826 and 20060206445.

The system 1 provides information to the workstations derived from the information acquired and computed by components 48, 50, 52, 54. In particular, the system interface generator 56 provides information for the printer driver 30, 32 to facilitate display of environmentally informed printer selection options in a graphical user interface on the workstation 8, 16, when the user is preparing to submit a job for printing. One suitable driver 30, 32 is the Xerox Mobile Express Driver (XMED) (see http://www.office.xerox.com/latest/SFTBR-14.PDF). This is a universal print driver with advanced capabilities, including the possibility to discover the printers in the environment and sort them according to their capabilities and "status." In its existing form, the "status" corresponds to whether a printer currently requires attention due to a failure or not, as the case may be. In the present exemplary embodiment, the status is extended to show one of more than two available states, such as at least four available states corresponding to "asleep," "awake," "waking up," and "broken."

The selection of environmental optimal job settings once a printer is selected may be further promoted by providing an indicator showing how green the current selected print settings are. The indicator becomes greener, for instance if the user changes his choice from single-sided to double-sided printing. While this indicator may be provided only once a printer is already selected, in other embodiments, it may be computed for all the selectable printers prior to selection. In either case, the displayed indicator promotes the selection of better choice of printer at job creation time, before the job is submitted from the workstation, depending on the printer's current state, since a user can always change his printer selection as well as the print settings.

Components 48, 50, 52, 54, 56 of the system 1 may be in the form of hardware or a combination of hardware and software. In the illustrated embodiment, the components are in the form of software instructions which are stored in main memory 60 and executed by a processor 62 of the server 12. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The print server 12 may include one or more suitable computing device(s) which includes data memory 64 for storing printer specific data 2 and the data acquired by the acquisition component 48 (here illustrated as a carbon footprint database 66 and printer wakeup database 68, respectively).

In the exemplary embodiment, the system 1 is aware of the current status of each of the linked printers 20, 22, 24 (e.g., whether it is in a ready mode, a warm-up mode, a stand-by mode, or an inoperative mode). In one embodiment, information 58 relating to the current mode of each networked printer 20, 22, 24 is stored in memory 64. Periodically, the acquisition component 48 queries the printers 20, 22, 24 to determine their respective current modes and updates the stored information accordingly.

The exemplary print server 12 may include one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. Components 36, 60, 62, 64 of the server may communicate via a data/control bus 70.

The network 14 may be in the form of wired or wireless links or other means capable of supplying or communicating electronic data to and/or from the connected/linked elements. For example, the links between elements can be telephone lines, computer cables, ISDN lines, wireless communication links (e.g., employing Bluetooth™ wireless technology), or the like.

Printers 20, 22, 24 may be electrophotographic printers, ink-jet printers, solid ink printers, thermal head printers used in conjunction with heat sensitive paper, or combinations or multiples thereof, or any other device capable of marking an image on a substrate. In general a printer 20, 22, 24 includes an image rendering component, which applies marking materials, such as inks or toners, to print media, and optionally a fixing component, which fixes the applied marking materials more permanently to the print media. Each of the printers 20, 22, 24 may be associated with a source of print media, such as a paper feeder (not shown), which may include one or more print media supply trays, each tray holding sheets of print media of a different type.

Each of the exemplary printers 20, 22, 24 may be considered to exist in a single one of a plurality of modes at any one time. For example, each printer 20, 22, 24 may have a stand-by power-saving mode ("asleep"), a warm-up mode, a ready mode ("awake"), and an inoperative mode ("broken"). In the stand-by mode, the printer 20, 22, 24 is not capable of printing and needs to go through the warm up-mode before it can print a print job. In the ready mode, the printer 20, 22, 24 may be either idle or printing. In the inoperative mode, the printer has determined that it cannot perform printing until some problem with the printer is resolved, e.g., a paper jam is removed or a spent toner cartridge is replaced, or the printer has been switched off. As will be appreciated, the printer 20, 22, 24 may have more modes than these or may have more than one level of the stand-by or warm-up modes, e.g., depending on how long the printer has been inactive. For convenience, each printer 20, 22, 24 may be considered to have at least a high operational state, e.g., when it is a ready mode and a low operational state, i.e., lower than the high operational state, e.g., where it is in a stand-by mode. The high operational state is one in which the printer is either ready for printing or at least more ready than in the low operational state, for example less energy is required to be input to the printer for printing to commence in the high operational state than in the low operational state. In the low operational state, the printer can be automatically brought to the high operational state, e.g. by placing it in the warm-up mode.

The workstations 8, 16 can be any device capable of communicating with the print server 12 over the network 14. For example, the workstations 8, 16 can be personal computers, wherein each workstation 8, 16 includes an input/output interface for communicating with the network 14, a controller or CPU, a memory, and a graphical user interface (GUI) comprising a display 80, such as an LCD screen, and a user input device 82, such as a keyboard, key pad touch screen, cursor control device, or combination thereof. Alternatively, workstations 8, 16 can be other types of devices capable of communicating with the network. For example one or more of the workstations may be a PDA, mobile phone, or any other suitable device connected to the network 14. Each workstation 8, 16 may be configured for designating any one of the printers 20, 22, 24 as its default (target) printer and a subset of the printers on the network as alternate printers.

The exemplary printer drivers 30, 32 may be in the form of software, hardware or both. In the exemplary embodiment, the printer drivers include software stored in memory and which is executed by a processor (hardware), such as the respective computer 8, 16's CPU 84. The printer driver 30, 32 serves as the communication link between applications operating on the workstation 8, 16 and the page-description language used by the printers 20, 22, 24. The printer driver 30, 32 enables the workstation 8, 16 to communicate with the print server 12, including submitting print jobs 34 to be printed. In one embodiment, the printer driver 30, 32 executes instructions, stored in the personal computer's memory, for generating a print job ticket in accordance with default and/or user-selected parameters. The parameters may include an environmental parameter, which is a measure of the environment cost of printing the print job on a selected printer. The printer driver 30, 32 causes the set of processing instructions to be associated with the image or images to be printed, thereby creating a print job corresponding to the print object to be printed. The printer driver 30, 32 then communicates the print job 34 to the print server 12. An operating system for the workstation 8, 16 can be a conventional operating system such as for example, Windows, Linux, or Mac OS, which may coordinate usage of a single printer driver for all applications. Alternatively, each application which runs on the workstation 8, 16 may include its own printer driver. As will be appreciated, one or more applications and/or one or more printer drivers 30, 32 usable by the workstation 8, 16 can reside in locations other than the workstation's memory, such as on some other device connected to the network 14 (e.g., print server 12). For example, applications or printer drivers 30, 32 can be Internet or web-based.

The collected information acquired by the system 1 and processed by its components 50, 54, 52, 56 can be visualized at the user's workstation 8, 16 in different ways and at different occasions. As examples, the following are contemplated:

1. Permanent default printer display: a permanent widget on the user's desktop may be provided to keep the user informed about the current status of his favored printer(s).

2. Permanent print infrastructure display: a permanent widget may be provided on the user's desktop to represent the available print infrastructure augmented with current status information.

3. Display at print job submission time: whenever the user chooses to print a document, the printer choice is augmented with status information.

Figure 4:
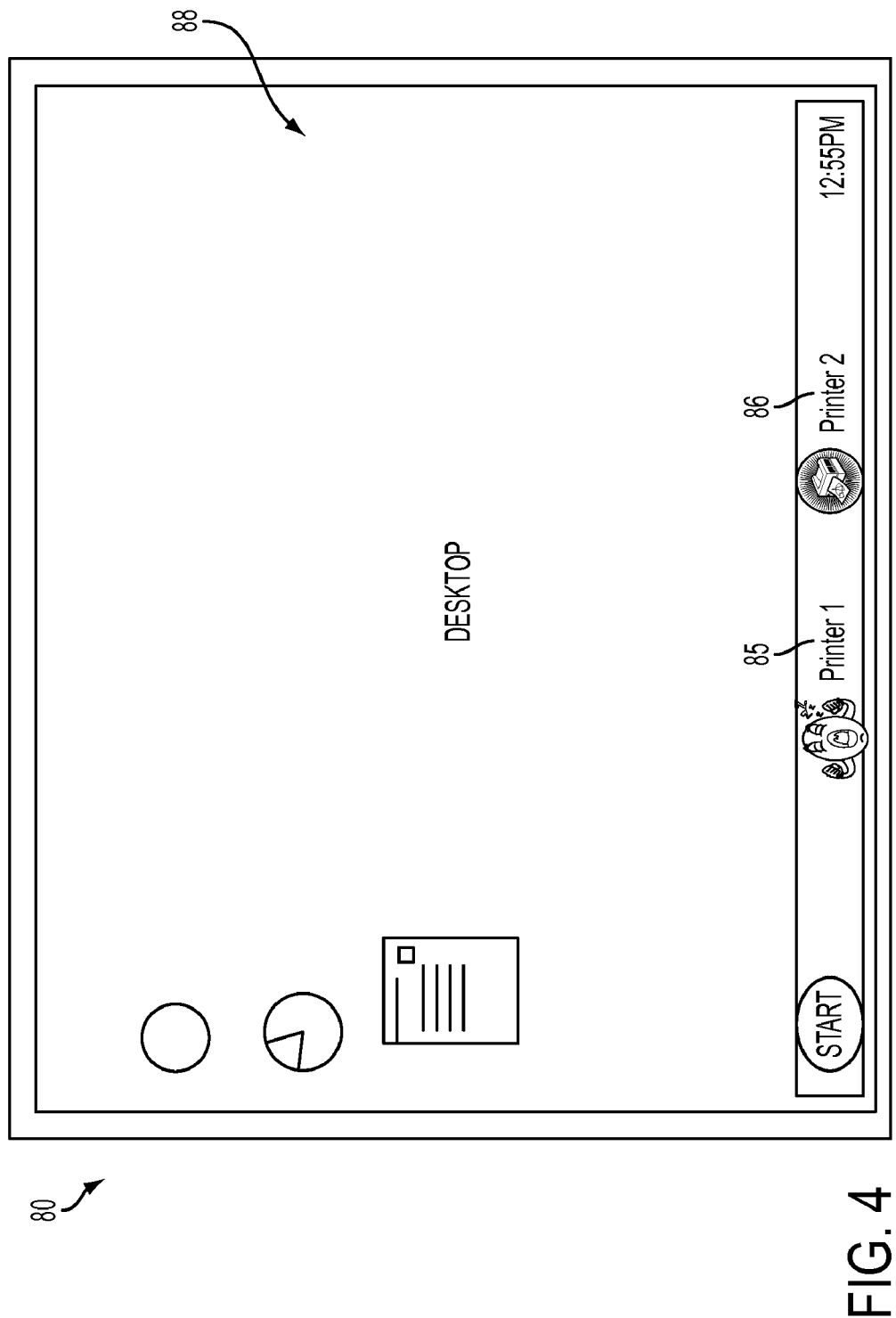
FIG. 4 illustrates an exemplary desktop screenshot in accordance with another aspect of the exemplary embodiment.

The first two options can be displayed as permanent widgets 85, 86 on the user's desktop 86 to keep him always informed on the current status of his favored printer or the close printer infrastructure (see, e.g., FIG. 4). In one embodiment, a user can create a print job simply by dragging a printing object onto one of the icons 85, 86.

Figure 5:
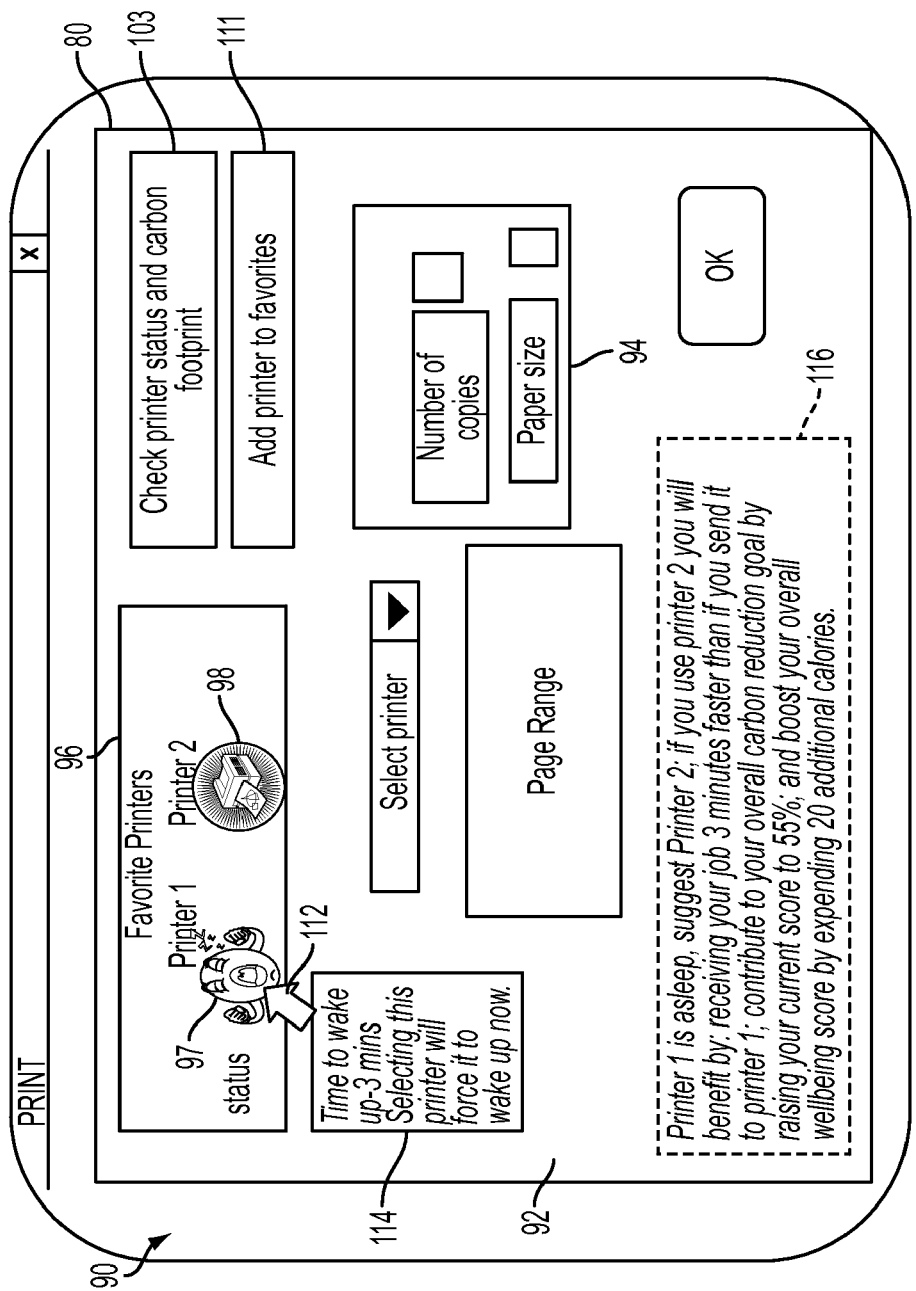
FIG. 5 illustrates an exemplary user interface for selection of printing parameters in accordance with another aspect of the exemplary embodiment.

The last option enables an informed printer choice for a job only when concretely needed, at print job creation/submission time. As illustrated in FIG. 5, for example, information to be presented to the user to assist him in making an environmentally informed printer selection at job submission time may be displayed through a graphical user interface 90 hosted by the workstation, 8, 16. For example, when the user selects the "Print" button in an application, the GUI 90 displays a pop-up menu 92 on the screen 80, which is generated at least in part with information provided by the interface generator 56. The information displayed includes the current status of user-selectable printers and/or corresponding carbon footprint (environmental cost) of printing the job on the printer. The user interacts with the menu via the keyboard, keypad, touch screen, mouse, or the like. One or more regions 94 of the menu show various selectable job settings, such as paper size, number of copies, etc.

Figure 6:
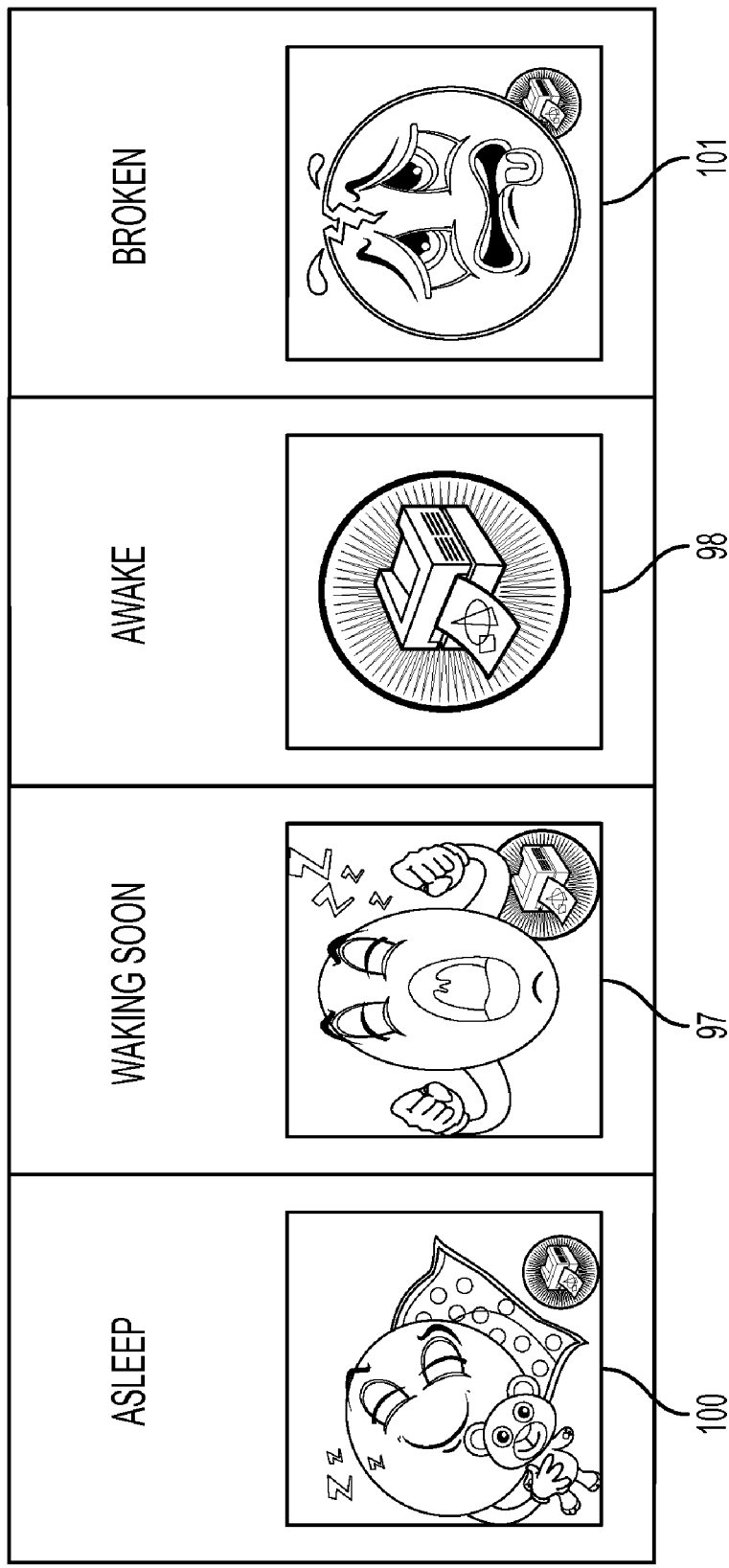
FIG. 6 illustrates icons for representing the status of printers.

The user may select to be informed of the status of his favored printer(s). In a corresponding widget, such a printer could be represented graphically through an appropriate icon representing its current state. For example, region 96 of the menu shows the current status of the user's favorite printers. Graphics, such as icons 97, 98 are used for displaying the current status. As illustrated in FIG. 6, there may be four such icons 97, 98 100, 101 available for display, respectively representing one of four different states of readiness of the printer: "asleep," "waking soon," "awake," and "broken." In one embodiment, the user, after considering a represented printer's status, may chose to drag and drop a file onto the corresponding icon 97, 98 100, 101 to launch the print job.

Users may also want to be informed about the status of all printers in the close environment. This may be useful if the user can switch between several comparable printers. In one embodiment, an environmental display menu 102 (FIG. 7) may be opened by a selection button 103 and displays a representation 104, 106 of the environmental cost (e.g., an approximation its carbon footprint) for each of the user-selectable printers, for printing the job. The environmental cost may, for example, be shown beside the printer icon as a more or less filled green bar. Here, the representation of the cost is the height of a vertical bar, with increasing height corresponding to higher environmental cost. The environmental cost can be computed on the same basis for all printers in order to allow a comparison. For example, if the printer is asleep, the wake-up cost is added to the normal (i.e., awake) carbon footprint and the bar is higher. Bar 106 is higher than bar 104, which is at least partly due to the state of the corresponding printer. As shown by the icon 100, this printer is "asleep," while the other printer is awake. The printer with the "broken" icon 101 has no environmental cost because it is not currently available for printing.

The environment display menu 102 enables the user to adapt his printing behavior to the global status the set of considered printers. The display can directly represent complementary information, such as the geographic proximity between the user and the various printers, the number of jobs already in the individual printer's queue, or other printer status information. The representation can further include information about the actual carbon footprint, print delay or financial costs of printing on a particular printer (depending on the printer status (awake/asleep). These criteria might furthermore be included as sorting options 108 in the printer driver interface, displayed, for example, when an options button 110 is actuated. Thus a user can easily select the environmentally friendliest appropriate printer for his job.

Menu 92 may also enable a user to add a printer to the favorites displayed in area 96. For example, as shown in FIG. 5, an "add printer" button 111 may cause a menu of possible printers to be displayed, from which a user can select one or more to add to the favorites.

In some embodiments, menu 102 may serve as main menu 92, with information shown as being displayed in menu 92 being incorporated into menu 102. In this embodiment, some of the information in the environmental display (e.g., carbon footprints) may be left blank until the user has had the opportunity to select print settings.

In the exemplary embodiment, when the user is, for instance, aware of the fact that his favored printer is not available for printing or that the carbon footprint would be rather high, e.g., because the printer is in sleeping mode, he can directly identify a more optimal but still proximately close other available printer to replace it for printing the job. The information on how environmentally friendly each printer is enables the user to appreciate the advantages and disadvantages of the individual printers at a given time.

The information about the current printer status, in the case of the awake and broken states, and the current print queue can be obtained directly from the printer(s) and is provided to the print driver so that the information displayed is kept current. The "waking soon" icon 97 (FIGS. 5 and 6) is displayed when the system 1 predicts that the printer will soon (i.e., within a predetermined period, such as 1 minute or 5 minutes) be automatically changing state from its "asleep" to its "awake" mode. This icon is generated in response to a prediction by the status computation component 50. The information about the expected wake up of the printer can be based on an estimation of the "hours of operation" is provided by the status estimation component 50. One suitable tool 3 for computing estimated wake-up is the PowerSense™ tool, which collects and analyzes printer usage and energy consumption patterns over time. It allows the system 1 to predict when a given device can be expected to wake up. This may be performed by a statistical analysis over a time window of use, e.g., for every day of the week and hour of operation. The PowerSense™ tool also has other features, such as timeout optimization which is used to calculate optimal timeouts given usage and power consumption data. Such a tool may be enhanced in order to provide energy based re-routing options that could also be of interest to the user.

The system 1 also allows the driver 30, 32 to display information on proximity of other printers, based on information provided by the Print Infrastructure Mining (PIM) component 54. The Print Infrastructure Mining (PIM) component 54 can provide proximity information based on user/printer usage as for example the most likely preferred printers by users as well as an indirect measure of proximity between devices. Environmental cost information is computed by E-Component 52, based on data stored in the carbon footprint database 66, for the user's available printers.

To classify a printer either as asleep or awaking soon, the S-component 50 of system 1 may apply a threshold delay TD. If a printer is currently asleep but is supposed to wake up within a delay D≦TD it is labeled as awaking soon. If it is supposed to wake up within a delay D>TD, it is labeled as asleep. The threshold delay TD can be different for different users, e.g. depending on their job profile and their typical tasks. In one embodiment, TD may be dynamically adapted and learned for the individual user. This may be performed, for example by recording the behavior a user adopts with respect to printers labeled as awaking soon and the delay the user is willing to accept (or not) for his print jobs to be more environmentally friendly.

In one embodiment, a minimal possible threshold delay $TD_{min}$ may be established, defining a delay below which there would be no considered difference between a printer being awake and a printer awaking soon and that is at least equal to the time required to physically wake up the printer. A maximal threshold delay $TD_{max}$ may also be established, defining a delay that is so long that there would be no considered difference between printers being asleep and printers awaking soon.

Initially the threshold delay TD may be set to a default value $TD_0$. The system 1 then continuously observes the user's behavior and adapts the current threshold delay $TD_C$ accordingly, as follows:

If the user repeatedly accepts a delay that is close to the current threshold delay $TD_{C1}$ and if the current threshold delay is below the maximum threshold delay $TD_{max}$ it can be slightly increased to $TD_{C2}$, i.e., $$TD_{C2}=TD_{C1}+\Delta TD_1$$

If the user frequently rejects a delay that is significantly lower than the current threshold delay $TD_{C1}$ and if the current threshold delay is above the minimum threshold delay it can be decreased, i.e. $TD_{C2}=TD_{C1}-\Delta TD_2$ Whenever a user accepts a delay that is significantly below the current threshold but still significantly above the minimal threshold delay $TD_{min}$ the information is kept for adapting $\Delta TD_2$ later, in order to avoid lowering TD too much.

This procedure allows the user to bypass the waiting delay from time to time to print urgent jobs without immediately lowering the current threshold delay. After a while, TD will be close to the delay usually accepted by the user. So sending a job to printers awake or awaking soon will be considered equivalent.

Figure 7:
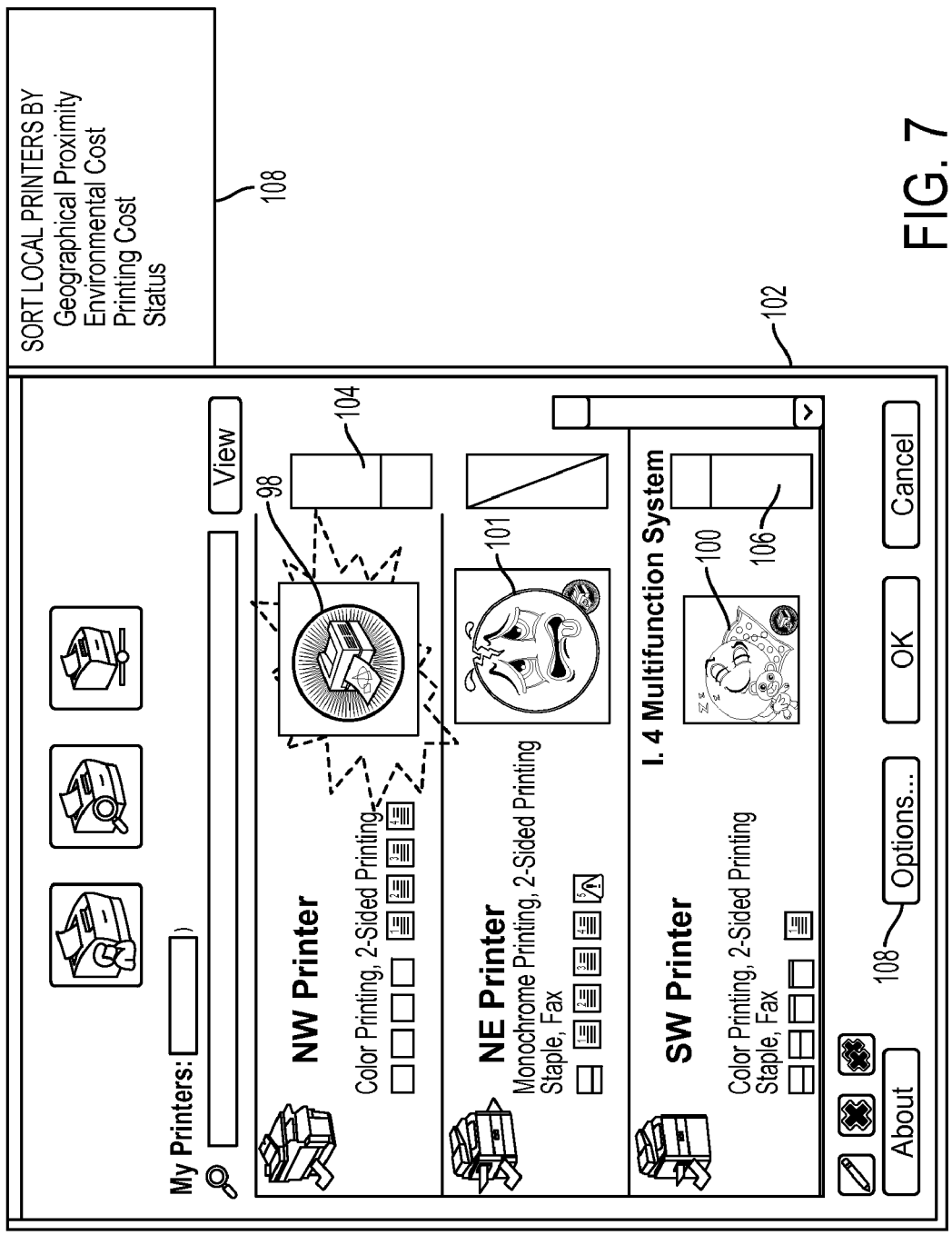
FIG. 7 illustrates a screenshot of a printer selection menu.

When the user addresses his document to a printer of his environmental display 102, provision may be made for the "greenest" printer (the one with the current lowest environmental cost) to visually attract the user's attention, for example by flashing (see NW printer in FIG. 7). Generally this will be a printer that is awake or awaking soon because their printing delays are usually acceptable by the user and their environmental impact will be low. When dragging the print job on the icon corresponding to a printer awaking soon, or otherwise selecting such a printer, the user is able to choose between either submitting the job immediately anyway, thus necessitating the wake up of the printer first, or to delay printing to the expected wake up time, as noted above. The collected data about acceptable print delays can be used to tune the threshold delay to use for labeling printers as awaking soon or asleep, as described above.

When moving the cursor 112 over a printer icon 97 (FIG. 5), the delay to expect when submitting a new job to that printer until the actual start of the print job may be displayed. If a printer is expected to wake up soon, the expected delay until wake up is shown, as illustrated at 114. When dragging a new print job on the icon corresponding to a printer awaking soon, the user may be provided with an opportunity to choose between either submitting the job immediately anyway, thus requesting the printer to wake up, or to delay printing to the expected wake up time, thus being more environmentally conscious, trading off time against environmental cost.

The user may be provided the choice to select his preferred printers for display in the environment display 102. He generally knows their attributes, such as quality, location. Thus, additional information on the attributes of the printers can be omitted from the environment display 102.

In another embodiment, an advanced environmental sorting option provides the users with the opportunity to specify tolerance levels with respect to acceptable printing delay, distance from the printer, print quality etc. Printers that do not match the user's constraints can then be automatically filtered out from the proposed printer list (or, for instance, may appear grayed out at the bottom of this list). The remaining printers can be sorted according to their environmental cost. For printers that are currently asleep but expected to wake up within the acceptable delay specified by the user, the print job can be automatically delayed until the printer wakes up. In this embodiment, the expected environmental cost used to rank such a printer need not include wake-up costs, while for printers expected to be still asleep when the acceptable delay is over, the environmental cost will be augmented by the wake up costs. Again the collected data about acceptable print delays for users can be used to tune the threshold delay to use for labeling printers as awaking soon or asleep, as described above.

This option can be based on the XMED driver whereby all printers are discovered dynamically, independently from user constraints (location, quality . . . ). Since in this embodiment, the user does not necessarily know the characteristics of the available printers, more information about the attributes of the printers may be provided in the environmental display 102 than in the case where the user selects the printers.

To influence the user's decision to conserve energy, the display may include functionality that may be voluntary or imposed at an organizational level for influencing a user to conserve energy. Generally, functionality for influencing energy conservation may be guided by one or more parameters for assisting the user to make environmentally sound decisions and/or to reach predefined energy savings goals. The functionality may, for example, identify measures that are important to the user that (i) identify improved efficiencies while indirectly achieving an energy setting or (ii) identify direct energy savings due to behavioral change, such as:

(1) a carbon footprint goal (how is the user's carbon footprint being reduced by choosing the alternative printer);

(2) a health goal (how many calories will the user expend by choosing the alternative printer);

(3) an efficiency goal (how much time will the user save by not having to wait for the printer to warm up and use the alternative printer that is awake).

The printer interface 90 may be adapted to influence the user with such functionality by providing a progress report 116 which may also include suggestions for conservation, for example: "Printer A is asleep, suggest Printer B; if you use printer B you will benefit by: receiving your job X minutes faster than if you send it to printer A; contribute to your overall carbon reduction goal by raising your current score to Y %; and boost your overall wellbeing score by expending Z additional calories" (FIG. 5).

Figure 3:
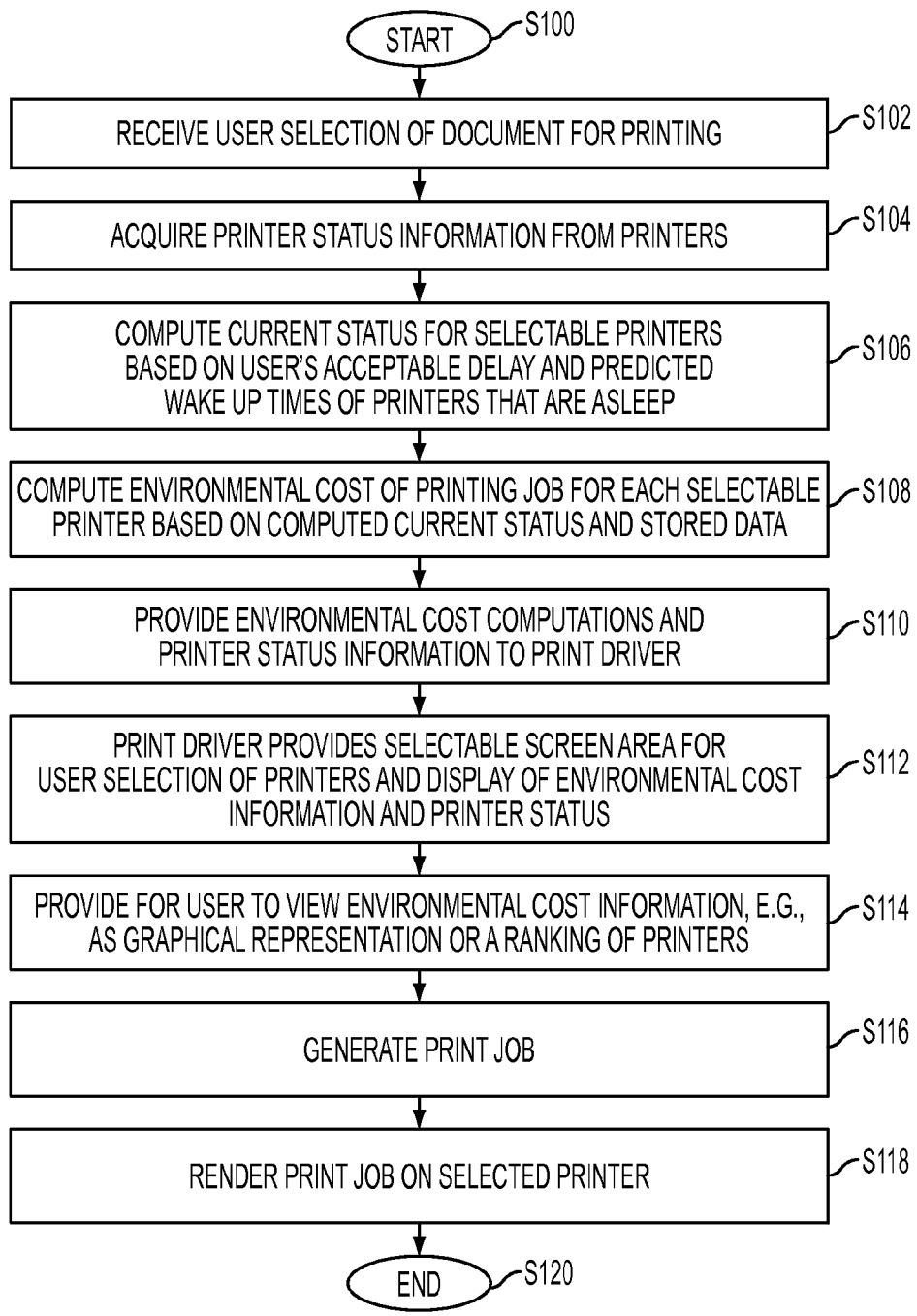
FIG. 3 illustrates a method of printer selection in accordance with another aspect of the exemplary embodiment.

FIG. 3 illustrates a method of print job management which may be performed with the system of FIGS. 1 and 2. The method begins at S100.

At S102, a printing object, such as a document, is selected by the user of a workstation 8, 16 for printing, for example, by clicking on a print button in the application.

At S104, printer status information is acquired from printers on a network as well as predicted time to awake information in the case of a printer which is asleep.

At S106, the status of the local printers is computed by the system 1, based on the user's current time delay (TD) setting.

At S108, an environmental cost for printing the print job on the various printers is computed by the system, based on the computed status of each.

At S110, information acquired and processed by the system 1 at S104-S108 is sent to the printer driver 30, 32.

At S112, selectable printing parameters are displayed, by the printer driver 30, 32, in a menu, for generating a print job comprising the object on one or more available printers (FIG. 5). Parameters may include printer status information. The printer menu 92 may also display user goals, and a progress report 116.

At S114, provision is made for a use to view a representation of the environmental cost of printing on a plurality of printers (FIG. 6). In one embodiment, S108 is performed only in response to a user requesting this information.

At S116, a print job 34 is generated by the print driver 30, 32 on the workstation 8, 16 to be printed on a selected printer and submitted to the print server 12.

At S118, the print job 34 is rendered on the selected printer.

The method ends at S120.

The method illustrated in FIG. 3 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for print job management.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for facilitating environmentally informed print job selection, comprising:
   with a processor, assigning a status to each of a set of networked printers, the status of an operational printer denoting a printer as being one of at least awake, asleep, and waking up soon; and
   when a printing object has been selected by a user at a workstation, providing the assigned status to a graphical user interface of the workstation for displaying to the user prior to submission of the printing object for printing, enabling a user to compare the status of user-selectable ones of the set of printers for selection of a printer for printing a print job.

2. The method of claim 1, wherein the assigning a status includes establishing a threshold delay and, where a printer which is currently asleep is expected to wake up before the threshold delay has expired, assigning a waking up soon status to the printer.

3. The method of claim 2, wherein the threshold delay is based on prior accepted delay times by the user.

4. The method of claim 1, wherein the assigning a status includes establishing a maximum delay and, where a printer which is currently asleep is not expected to wake up before the maximum delay has expired, assigning an asleep status to the printer.

5. The method of claim 1, further comprising providing a respective icon for each printer status which is graphically displayable on the graphical user interface in association with a printer that is assigned that status.

6. A method or facilitating environmentally informed print job selection, comprising:

with a processor, assigning a status to each of a set of networked printers, the status of an operational printer denoting a printer as being one of at least awake, asleep, and waking up soon and providing the assigned status to a graphical user interface, enabling a user to compare the status of user-selectable ones of the set of printers for selection of a printer for printing a print job, wherein assigning a broken status is assigned to a printer which is determined to be inoperative or exhibiting a soft failure; and providing a respective icon for each printer status which is graphically displayable on the graphical user interface in association with a printer that is assigned that status, including providing a corresponding icon for the broken status, which is graphically displayable on the graphical user interface for a printer that is assigned that status.

7. The method of claim 1, further comprising computing an environmental cost for a print job on at least one of the printers based on its assigned status and providing information on the environmental cost to the graphical user interface.

8. The method of claim 7, wherein the providing the environmental cost includes providing for a graphical representation of the environmental cost of printing the print job for each of a plurality of the set of printers.

9. The method of claim 1, wherein the assigning the status includes predicting when a printer which is asleep will wake up based on a stored protocol which determines when a printer will automatically wake up absent it receiving an intervening print job which causes the printer to wake up.

10. The method of claim 1, wherein when a printer is in an asleep status, it is unable to print the print job without first waking up to an awake status.

11. The method of claim 1, further comprising, when a user selected printer is asleep, prompting the user to select between causing the printer up to wake up and waiting for the printer to wake up.

12. The method of claim 1, further comprising providing for a user to view the time at which a printer that is asleep is expected to wake up.

13. The method of claim 1, further comprising identifying the user selectable ones of the printers based on print infrastructure mining.

14. The method of claim 1, providing for a ranking of at least some of the printers in the set to be displayed on the graphical user interface, the ranking being based on the environmental cost for each printer to print the print job.

15. The method of claim 1, further comprising, providing the assigned status of a plurality of the set of printers to be displayed on the GUI whereby a user can view the assigned status of each of the plurality of printers prior to electing to print a printing object.

16. The method of claim 1, further comprising storing carbon footprint information for each of the set of printers, the environmental cost being based on the printer's carbon footprint information and its status.

17. A method for facilitating environmentally informed print job selection, comprising:

with a processor, assigning a status to each of a set of networked printers, the status of an operational printer denoting a printer as being one of at least awake, asleep, and waking up soon, providing the assigned status to a graphical user interface, enabling a user to compare the status of user-selectable ones of the set of printers for selection of a printer for printing a print job; and when a user selects a printer for printing the print job, providing for the graphical user interface to display the effect of printing the print job on an alternative printer on user goals selected from:
(1) a carbon footprint goal, including an estimation of the effect on the user's carbon footprint by choosing the alternative printer;
(2) a health goal, including an estimation of a number of calories the user would expend by choosing the alternative printer; and
(3) an efficiency goal including an estimation of how much time the user would save by not having to wait for the printer to warm up by using the alternative printer that is awake.

18. A computer program product comprising a non-transitory medium encoding instructions which, when executed by a computer, perform the method of claim 1.

19. A system for facilitating environmentally informed print job selection, comprising:

memory storing instructions for:
assigning a status to each of a set of networked printers, the status of an operational printer denoting a printer as being one of at least awake, asleep, and expected to awake shortly,
computing an environmental cost for a print job based on a selected printer and its assigned status, and
providing for the assigned status and the environmental cost to be displayed on a graphical user interface, enabling a user to compare the assigned status and environmental costs of user selectable ones of the set of printers, each assignable printer status being associated with a respective icon displayable on the graphical user interface to denote the current tatus of each user-selectable printer; and a processor in communication with the memory for executing the instructions.

20. The system of claim 19, wherein the system is resident on a print server.

21. The system of claim 19, further comprising memory which stores status related information received from the set of printers and carbon footprint information for each of the set of network printers.

22. The system of claim 19, further comprising instructions which predict when an asleep printer is expected to wake up.

23. A network printing system comprising the system of claim 19, a plurality of printers which provide status information to the system, and at least one workstation in communication with the system which hosts the graphical user interface.

24. A graphical user interface hosted by a computer with a processor and memory, the graphical user interface being configured to display a printer selection menu in which an environmental cost of printing a print job on each of a plurality of user selectable printers is represented, the environmental cost being derived, at least in part, from a status of the selectable printers, whereby the environmental cost of printing the job on a first of the printers is higher when the first printer has to be woken up to perform the print job than when the first printer does not have to be woken up.

25. A method for facilitating environmentally informed print job selection, comprising:

with a processor, assigning a status to each of a set of networked printers, the status of an operational printer denoting a printer as being one of at least awake, asleep, and waking up soon;
computing an environmental cost for a print job based on a selected printer and its assigned status;
providing the environmental cost to a graphical user interface, enabling a user to compare environmental costs of user selectable ones of the set of printers.

* * * * *